United States Patent [19]

Pagel

[11] 3,894,112

[45] July 8, 1975

[54] BONDING FILM CONTAINING POLYTETRAMETHYLENEOXIDE ELASTOMERIC SEGMENTS AND POLYEPOXIDE

[75] Inventor: Warren C. Pagel, North Hudson, Wis.

[73] Assignee: Minnesota Mining and Manufacturing Company, Saint Paul, Minn.

[22] Filed: Feb. 23, 1974

[21] Appl. No.: 445,169

Related U.S. Application Data

[60] Division of Ser. No. 873,132, Oct. 31, 1969, which is a continuation-in-part of Ser. No. 579,495, Sept. 15, 1966, abandoned.

[52] U.S. Cl................260/830 R; 117/138.8 F; 117/138.8 N; 161/186; 260/830 TW; 260/836; 260/837 R
[51] Int. Cl...................... C08g 45/00; C08g 45/04
[58] Field of Search .............................. 260/830 R

[56] References Cited
UNITED STATES PATENTS
3,436,359   4/1969   Hubin ........................... 260/830 R Primary Examiner—Paul Lieberman
Attorney, Agent, or Firm—Alexander, Sell, Steldt & Delahunt

[57] ABSTRACT

A heat-curable self-supporting organic polymeric bonding film consisting essentially of a single reactive layer that includes a composition comprising (1) 100 parts by weight of heat-curable epoxy resin; (2) a high-molecular-weight flexibilizing polymer that is reactive with epoxy resin and provides 5 to 40 parts by weight of elastomeric segments in the composition for each 100 parts by weight of epoxy-resin segments; and (3) a room-temperature-latent curing agent. An exemplary composition includes a blend of diglycidyl ethers of bisphenol A; a carboxylated acrylonitrile-butadiene elastomer; and a curing agent combination of a substituted urea and dicyandiamide.

6 Claims, No Drawings

BONDING FILM CONTAINING POLYTETRAMETHYLENEOXIDE ELASTOMERIC SEGMENTS AND POLYEPOXIDE

CROSS REFERENCE TO RELATED APPLICATION

This application is a division of my co-pending application Ser. No. 873,132, filed Oct. 31, 1969, which is a continuation-in-part of application Ser. No. 579,495, filed Sept. 15, 1966, now abandoned.

BACKGROUND OF THE INVENTION

Many high-performance, lightweight structural members including such aircraft parts as exterior surface panels, movable sections of wings, and propeller and helicopter rotor blades are formed by bonding thin metal sheets together or to metal honeycomb cores with organic polymer bonding films. The bonds in these high-performance structural members are subjected to a variety of severe stresses at a wide range of temperatures. Strength standards for the bonds have been developed in the industry and may be summarized in the following table (the test method is identified in footnotes):

| Temperature of test | 67°F. | 75°F. | 180°F. | 250°F. |
|---|---|---|---|---|
| Overlap shear[1] (minimum in pounds/square inch) | 3500 | 3500 | 2000 | 750 |
| T peel[2] (minimum in pounds/inch of width) | 15 | 15 | 15 | |
| Honeycomb peel[3] (minimum in inch-pounds/inch of width) | 10 | 10 | 10 | |
| Beam-creep[4] (maximum in mils) | | 50 | 50 | |

[1] The free ends of strips of 1-inch-wide, 4-inch-long, 64-mil-thick, 2024 T3 clad aluminum alloy sheeting bonded together at their other ends in a ½-inch-overlapping joint are pulled in opposite directions along their longitudinal axes. The bonds are formed with a bonding film having a weight of about 0.08-pound/square foot (used in all the tests), and the bonding surfaces of the adherends have normally been primed by coating with a resinous primer (as in all the tests).

[2] The adjacent ends of 1-inch-wide, 8-inch-long, strips of 20-mil 2024 T3 clad aluminum alloy sheeting adhered together over most of their length are bent apart at right angles and pulled in opposite directions.

[3] A free end of a 3-inch-wide, 10-inch-long, 20-mil 2024 T3 clad aluminum alloy sheeting is pulled from the ½-inch-thick, ¼-inch cell honeycomb core of 4-mil 3003 aluminum alloy foil to which it is bonded by wrapping the sheeting around a 4-inch-diameter roller riding on the surface of the sheeting.

[4] Three inch-wide, 8-inch-long laminates of the described honeycomb core with 64 mil skins of 2024 T3 clad aluminum alloy sheeting are placed on supports spaced 6 inches apart. A 1000-pound weight at 75°F. and an 800-pound weight at 180°F. are loaded midway between the supports. After 192 hours the deformation of the center of the beam is measured.

Sheet-to-sheet bonds and sheet-to-honeycomb bonds have different, competing requirements, and no bonding film has previously been available that reliably provided both kinds of bonds. The requirements for sheet-to-sheet bonds have generally been met with expoxy- or phenolic-based bonding compositions modified by the addition of rather large amounts of flexibilizing materials, such as nylons, polyvinyl acetal resins, and acrylonitrile-butadiene elastomers. These flexibilized compositions have been required to provide the peel strengths necessary in sheet-to-sheet bonds.

But the use of large amounts of flexibilizers in sheet-to-sheet bonding films prevents those bonding films from being satisfactory for sheet-to-honeycomb bonds. The achievement of satisfactory bonds to honeycomb requires a material that exhibits flow and other characteristics during initial heating of the bonding film causing the film to wet and fillet along the contacted edge portion of honeycomb. The previous flexibilized bonding films useful for sheet-to-sheet bonds have not exhibited the necessary filleting characteristics. More than that, the cured bonds produced by these previous flexibilized bonding films have generally been so flexible that they permitted excessive deformation of the final sheet-to-honeycomb structure.

In an attempt to provide a bonding film useful for both sheet-to-sheet and sheet-to-honeycomb bonds, bonding films of two layers, one an epoxy composition and the other an epoxy-elastomer or phenolic-elastomer composition, have been produced; see Martin et al, U.S. Pat. No. 2,951,004. However, such bonding films have generally not met the needed strength requirements over the wide range of temperatures set out in the table above. Further, when forming sheet-to-sheet bonds, the layer of pure epoxy composition has sometimes caused the bond to fail under peel stresses. Also, care has been needed to assure that the correct side of the composite bonding film was placed against the honeycomb, and this requirement has caused errors, waste and delay in the production process.

What has been needed is a bonding film that consists essentially of a single reactive layer that flows sufficiently when initially heated so that it will wet and fillet on honeycomb and still will exhibit the strength properties summarized above. But although the two-layer bonding films have been sold for many years and their deficiencies recognized, a satisfactory single-layer bonding film useful for both kinds of bonds has never been produced.

SUMMARY OF THE INVENTION

The present invention provides the needed single-layer heat-curable self-supporting bonding film. The single reactive layer of a bonding film of this invention includes (a) a heat-curable composition that comprises an epoxy resin which has on the average more than one 1,2 epoxy group per molecule; (b) a high-molecular-weight flexibilizing polymer that has reactive functional groups by which the polymer may be crosslinked to epoxy resins and that provides 5 to 40 parts of elastomeric segments in the composition for each 100 parts of epoxy resin segments; and (c) a room-temperature latent curing agent that is active at elevated temperatures to initiate reaction of the composition to an integrated state. A preferred flexibilizing polymer comprises a reactive acrylonitrile-butadiene polymer; for example, a reactive acrylonitrile-butadiene elastomer may simply be mixed with the other ingredients, or a flexibilizing polymer may be formed by prereacting a reactive acrylonitrile-butadiene polymer with at least part of the epoxy resin in the composition.[5] The film generally is between about 5 and 30 mils in thickness and a scrim-type fabric may be embedded in it. To assure that there is no prereaction of the flexibilizing polymer with itself or with the epoxy resin, the reactive layer of the bonding film is essentially free of room-temperature-active curing agents.

5. "Elastomer" and "elastomeric" are used in this specification to describe substances that can be stretched at room temperature to at least twice their original length, and after having been stretched and the stress removed, return with force to approximately their original length in a short time. "Vulcanizable elastomer-precursor," or more simply "elastomer-precursor," is used in this specification to mean polymeric materials that may be crosslinked in a vulcanizing-type reaction to provide a substance that meets the above description. As an example, for purposes of this specification, "vulcanizable elastomer-precursor" and "elastomer-precursor" include so-called liquid elastomers, such as liquid acrylonitrile-butadiene polymers. "Segment" is used in this specification to mean a molecule or portion of a molecule. "Elastomeric segments" is used to describe either separate elastomeric molecules or portions of molecules that would be elastomers or vulcanizable elastomer-precursors as described above if they were a separate molecule rather than a portion of a molecule. "Epoxy-resin segments" is used to describe either separate epoxy molecules having one or more 1,2 epoxy groups and an average epoxide-equivalent weight less than about 5,000 or to describe portions of molecules that have the same structure and composition as the separate epoxy resin molecules just described.

One reason for the success of bonding films of the invention is that they incorporate a flexibilizing polymer that is reactive with epoxy resin. However, bonding films of the invention are not the first to incorporate a reactive elastomeric material in combination with epoxy resin. For example, one previous commercial bonding film included 100 parts epoxy resin, 50 parts carboxylated acrylonitrile-butadiene elastomer, and 10 parts of a thermoplastic flexibilizing polymer. This bonding film, however, was designed for and could only be used for sheet-to-sheet bonds, and it did not change the general view that single-layer epoxy-elastomer compositions could not be used for both sheet-to-sheet and sheet-to-honeycomb bonds. Another prior suggestion occurred in the Martin et al patent cited above, where an adhesive composition including 100 parts epoxy resin and 15 parts of carboxylated acrylonitrile-butadiene elastomer was suggested for use as one of the layers of a two-layer bonding film. But that suggested adhesive composition also included curatives for the elastomer, and it is now known that, especially under the storage conditions used for bonding films at that time, those curatives caused premature reaction between the epoxy resin and the carboxylated elastomer. This premature reaction stiffened the composition, making a film of the composition quite unsuitable for use in bonding to honeycomb structure. Rather than dispelling the common conception that single-layer flexibilized bonding films could not be used for the bonds in both sheet-to-sheet and sheet-to-honeycomb structural members, the prior suggestion in Martin et al. reinforced that common conception.

Another type of prior work with adhesive compositions that incorporate epoxy resins and carboxylated acrylonitrile-butadiene elastomers is found in Marks, U.S. Pat. No. 3,312,754. That patent suggests a liquid adhesive composition for use to adhere the seams of metal cans, and the composition suggested includes the reaction product of a liquid epoxy resin and liquid carboxylated acrylonitrile-butadiene elastomer, as well as other flexibilizing materials. Because it is liquid, this adhesive composition is not useful as a bonding film. But more than that, when the composition is tested by the above standard tests for the bonds in high-performance structural members, it fails to pass nearly all of the standards. It is now known that a major reason for the inability of this adhesive composition to meet the strength requirements for high-performance structural members is the low molecular-weight of the reaction product of epoxy resin and carboxylated acrylonitrile-butadiene elastomer used in the adhesive composition.

Now, contrary to what the prior experience in the art suggested, applicant has found that bonding films of this invention satisfactorily provide both the sheet-to-sheet and sheet-to-honeycomb bonds in high-performance structural members. Bonding films of the invention do become flowable when heated to an elevated temperature so that they will wet and form a fillet on the edge portion of a honeycomb pressed against the film. Furthermore, after a bonding film of the invention has cured, a bond is formed that does not exhibit excessive creep and meets each of the other standards recited in the above table.

Another desirable feature of preferred bonding films of this invention is that they cure at a temperature of 250°F. This low curing temperature is a significant advantage, first, because it reduces the cost and shortens the time of the curing operation. Further, aluminum, which is a common structural material, is desirably not subjected to temperatures above 250°F. because of possible corrosion effects and reduction of fatigue resistance.

All in all, bonding films of the invention met an important and large need in the structural adhesives industry; since the parent of this continuation-in-part patent application was filed, bonding films of the invention have largely supplanted the previously long-used two-layer bonding films, and bonding films of the invention have assumed a major role in bonding both sheet-to-sheet and sheet-to-honeycomb laminated structural members.

DETAILED DESCRIPTION

The invention will first be illustrated by reference to two exemplary bonding films.

EXAMPLE 1

A bonding film was formed from the following ingredients:

| | | | Parts by Weight |
|---|---|---|---|
| Epoxy resin (a room-temperature-solid blend comprising the following reaction products of bisphenol A and epichlorohydrin): | | | 100 |

| | Softening point by Durran's method | Epoxide Equivalent Weight | Parts by Weight |
|---|---|---|---|
| Epon 834 | 82°F. | 225–290 | 63.1 |
| EKRB 2002 | 145–170°F. | 450–525 | 26.5 |
| ERL-2774 | liquid at 80°F. with viscosity of 11,000 – 14,000 cps | 180–195 | 10.4 |

| | Parts by Weight |
|---|---|
| Carboxylated acrylonitrile-butadiene elastomer (Hycar 1072; a room-temperature-solid elastomer having a number-average molecular weight of about 30,000 and comprising about 5% acrylic acid, 35% acrylonitrile and 60% butadiene) | 24.5 |
| 3-(p-chlorophenyl)-1,1-dimethylurea | 3.1 |
| Dicyandiamide | 6.3 |
| Chrome oxide colorant | 0.7 |
| Acetone solvent | 90.0 |

The carboxylated elastomer was first milled into a sheet in a rubber mill and the sheet then cut up and mixed with acetone in a churn until dissolved. The 3-(p- chlorophenyl)-1,1-dimethyl urea, dicyandiamide, and chrome oxide were mixed into the ERL 2774 epoxy resin in two passes on a paint mill. The Epon 834 epoxy resin was heated to about 120°F and added, together with the EKRB-2002 epoxy resin, to the carboxylated elastomer solution in acetone. After this, the materials premixed on the paint mill were added to the acetone solution.

This mixture was knife-coated in a 13 mil-thick (wet) coating on silicone-treated glassine paper and dried for 30 minutes at 180°F. The resulting film was then wound in a roll, with a light, non-woven, Dacron scrim disposed on the exposed surface of the film, whereupon it became embedded in the film. The resulting film had a thickness of about 5 mils and a weight of about 0.03 pound/square foot. Thicker films were also made by laminating, in one case, two, and in another case, three, thicknesses of film together, with the liners for the second and third thicknesses removed to give films that weighed 0.06 (about 10 mils thick) and 0.08 (about 15 mils thick) pound/square foot.

Samples of the 0.08 pound/square foot-bonding film were used to adhere aluminum sheets together and to aluminum honeycomb cores for testing in the manner described above. The aluminum sheets had been etched with a sodium dichromate-sulfuric acid solution and coated with a resinous primer solution which had then been dried to a final thickness of 0.1 mil. The bonding film was placed between the sheeting and honeycomb core and the resulting sandwiches placed in a fixture under about 50 pounds/square inch pressure. The bonding film was then cured by heating at a temperature-rise rate of about 4°–8°F./minute to a temperature of 250°F. which was held for 60 minutes.

After this curing operation, the laminated structures were subjected to tests at −67°F., 75°F., 180°F., and 250°F. following the procedures set out above. The following results were obtained:

| Temperature of test | −67°F. | 75°F. | 180°F. | 250°F. |
|---|---|---|---|---|
| Overlap shear (pounds/square inch) | 5680 | 5340 | 3200 | 1200 |
| T peel (pounds/inch of width) | 28 | 40 | 28 | |
| Honeycomb peel (inch-pounds/inch of width) | 26 | 35 | 24 | |
| Beam-creep (mils) | | | 15 | 25 |

The following example illustrates a bonding film in which epoxy resin and a reactive elastomer-precursor are pre-reacted to form a flexibilizing polymer.

EXAMPLE 2

The ingredients were:

| | Parts by Weight |
|---|---|
| Epoxy resin comprising the following three reaction products of bisphenol A and epichlorohydrin and one triglycidyl derivative of paramino phenol (ERL-0510) | 100 |

| | Softening point by Durran's method | Epoxide Equivalent Weight | Parts by Weight |
|---|---|---|---|
| Epon 834 | 82°F. | 225–290 | 30 |
| Epon 1004 | 95–105°C. | 875–1025 | 40 |
| ERL 2774 | liquid at 80°F. with viscosity of 11,000 – 14,000 cps | 180–195 | 15 |
| ERL 0510 | liquid at 80°F. with viscosity of 500–700 cps | 97–101 | 15 |

| | Parts by Weight |
|---|---|
| Carboxylated acrylonitrile-butadiene vulcanizable elastomer-precursor Hycar CTBNX (a room-temperature-liquid vulcanizable elastomer-precursor having a number-average molecular weight of 3600 and including about 20 weight-percent acrylonitrile and 0.07 acid-equivalents per 100 grams of material) | 25 |
| Subsituted-urea reaction product of toluene diisocyanate and dimethyl amine | 8 |
| Dicyandiamide | 4 |
| Methyl ethyl ketone solvent | 50 |

The Epon 834 and Epon 1004 were placed in a reactor fitted with a stirrer, thermometer, and heating mantle and heated with stirring to 350°F. Then first the ERL-0510 was added, and then the Hycar CTBNX. The mixture was heated again to 350°F. and held at that temperature and stirred for 3 hours. During this reaction the acid number of the mixture was reduced to zero, indicating complete reaction between the elastomer and epoxy resin. The mixture was then cooled to room temperature and dissolved into the methyl ethyl ketone. To the resulting solution was added a mixture that had been prepared by grinding the dicyandiamide and reaction product of toluene diisocyanate and dimethyl amine into the ERL-2774 on a three-roll paint mill.

This solution was coated out in the manner described in Example 1 with a scrim cloth comprising a nylon tricot. The films were then tested by the standard procedures described above with the following results:

| Temperature of test | −67°F. | 75°F. | 180°F. | 250°F. |
|---|---|---|---|---|
| Overlap shear (pounds/square inch) | 6467 | 5167 | 3727 | 1520 |
| T-peel (pounds/inch of width) | 30 | 27 | 23 | |
| Honeycomb peel (inch-pounds/inch of width) | 18 | 19 | 16 | |
| Beam-creep (mils) | | | 4 | 9 |

The folmulations of Examples 1 and 2 are preferred, but useful bonding films may be provided with other materials and other proportions. In general, most heat-curable epoxy resins having on the average more than one reactive 1,2 epoxy group per molecule are suitable for incorporation in the adhesive compositions of this invention, including aliphatic, aromatic, and cycloaliphatic varieties. As the examples illustrate, several different epoxy resins can be used in combbination to provide a particular balance of properties. When the term epoxy resin is used in this specification it may mean either one epoxy resin or a combination of epoxy resins. Generally the epoxy resin or combination of epoxy resin is a room-temperature solid, although some liquid varieties may be prereacted with elastomer or elastomer-precursor to form the needed high-molecular-weight flexibilizing polymer. To avoid brittleness in the cured bond through excessive crosslinking, the epoxy groups should be separated by non-reactive portions of the molecule. In general, the spacing will be sufficient if the average epoxide-equivalent weight of the resin or resin blend is greater than about 200. Epoxy novolacs or other epoxy resins that have a high number of reactive groups and provide a high crosslink density in the cured bond may be used in bonding films of the invention and are especially useful to provide bonds of high performance at elevated temperatures.

The flexibilizing polymer in a bonding film of the invention may comprise separate elastomer molecules, separate elastomer-precursor molecules, combination molecules that include epoxy-resin segments and elastomeric segments, or mixtures of such separate and combination molecules. The combination molecules may be prepared by reacting epoxy resin and material that provides elastomeric segments in the reaction product, the reaction leaving reactive functional groups, such as unreacted epoxy groups, on the reaction product. In whichever form the flexibilizing polymer takes, it must have a high average molecular-weight to obtain the desired level of strength properties. Usually the flexibilizing polymer is a room-temperature solid (though it may within a few hours assume the shape of a container in which it is placed). As will be subsequently shown, it has been found that the needed molecular weight can generally be described by stating that a substantial number of the molecules of flexibilizing polymer should have a molecular weight above about 8,000; more specifically, the flexibilizing polymer should comprise sufficient molecules above about 8,000 in molecular weight to account for roughly at least about one-tenth of the wegith of the whole composition.

While the reasons for better strengths are not fully understood, the need for a high-molecular-weight flexibilizing polymer can be readily shown. For example, 15 parts of a liquid low-molecular-weight carboxylated acrylonitrile-butadiene elastomer-precursor simply mixed with the rest of the ingredients in a bonding film will not produce satisfactory strength properties, while 15 parts of a solid high-molecular-weight carboxylated acrylonitrile-butadiene elastomer will produce satisfactory strength properties. However, when a liquid low-molecular-weight elastomer-precursor is properly prereacted with part of the epoxy resin in a composition to form a flexibilizing polymer of high molecular-weight, satisfacotry strength properties are obtained.

The variation in properties obtained by varying the weight-percent of flexibilizing polymer that is above 8,000 in molecular weight is shown in Table II. In the tests reported in the table, bonding films were prepared using compositions in which the flexibilizing polymer varied from a liquid unreacted elastomer-precursor, through a series of reaction products of different molecular weight prepared by prereacting elastomer-precursor with epoxy resin; in some cases the prereaction product was supplemented with solid elastomer. The elastomer-precursor and epoxy resin were prereacted in the general manner described in Example 2, but at different reaction temperatures and times of reaction. As can be seen from Table II, higher temperatures and longer times of prereaction lead to a larger weight-percent of flexibilizing polymer that is above 8,000 in molecular weight.

The weight-percent of flexibilizing polymer above 8,000 molecular weight was determined with a gel permeation chromatograph (GPC). The GPC used was a commercially available instrument manufactured by Waters Associates (61 Fountain Street, Framingham, Massachusetts). Briefly, this instrument separates polymeric species according to molecular size (which can be correlated with molecular weight) by passage of a dilute solution (one-eighth to one-half percent) of the polymer of interest through a column packed with a uniformly crosslinked polystyrene gel. The abscissa on a typical chromatogram is usually calibrated in angstrom units, which refers to the average size of a species eluting at a particular time. The ordinate is proportional to the weight of polymeric species eluting at a particular time. By using standard calibration techniques, it was found that for the samples reported in Table II, the species having a molecular weight of about 8,000 eluted at the 390A point on the abscissa of the chromatogram. The assignment of molecular weight values to a particular point on the abscissa scale is regarded as accurate to within ±25 percent.

The weight-percent of polymeric species above 8,000 in molecular weight in a sample tested was found by measuring the percentage of the area of the chromatogram curve above 390A. The total weight-percent of a composition above 8,000 molecular weight was determined by assuming that, except for the solid elastomer (Hycar 1072) added to some samples in addition to the prereaction product, the other ingredients in the composition did not include material above 8,000 molecular weight. Ninety-five weight-percent of the solid elastomer was determined to be above 8,000 molecular weight, and thus, for the compositions that included solid elastomer, 95 percent of the amount of solid elastomer in the composition was added to the weight-percent obtained from the GPC curve.

TABLE II

|  | A* | B | C* | D | E | F | G | H | I | J | K |
|---|---|---|---|---|---|---|---|---|---|---|---|
| Prereaction conditions |  |  |  |  |  |  |  |  |  |  |  |
| Time (hrs) | 1 | 1 | 1 | 0 | 1 | 1 | 3 | 1 | 1 | 1 | 3 |
| Temp (°F.) | 300 | 300 | 300 |  | 300 | 300 | 350 | 300 | 300 | 350 | 350 |
| Prereaction components |  |  |  |  |  |  |  |  |  |  |  |
| Hycar 1300 X 2** | 15 |  |  |  |  |  |  |  |  |  |  |
| Hycar CTBNX |  | 10 | 15 | 15 | 15 | 15 | 10 | 15 | 15 | 15 | 25 |
| Epon 828 | 70 |  | 70 |  |  |  |  |  |  |  |  |
| Epon 834 |  | 30 |  | 30 | 30 | 30 | 30 | 30 | 30 | 30 | 30 |
| Epon 1004*** |  | 40 |  | 40 | 40 | 40 | 40 | 40 | 40 | 40 | 40 |
| ERL-0510 |  | 15 |  | 15 | 15 |  | 15 | 15 |  | 15 | 15 |
| ERL-2774 |  |  |  |  |  | 15 |  |  | 15 |  |  |

TABLE II—Continued

|  |  | A* | B | C* | D | E | F | G | H | I | J | K |
|---|---|---|---|---|---|---|---|---|---|---|---|---|
| Weight percent of pre-reaction product above 8000 molecular wt. | | 3.6 | 8.4 | 8.25 | 5.3 | 12.4 | 12.8 | 13.2 | 12.4 | 12.8 | 15.3 | 23.1 |
| Components added after prereaction | | | | | | | | | | | | |
| Hycar 1072 | | | | | 5 | | | | 5 | .5 | 5 | |
| ERL-2774 | | | 15 | | 15 | 15 | | 15 | 15 | | 15 | 15 |
| ERL-0510 | | | | | | | 15 | | | 15 | | |
| Dicyandiamide | | 3.3 | 4 | 3.3 | 4 | 4 | 4 | 4 | 4 | 4 | 4 | 4 |
| Reaction product of toluene diisocyanate and dimethyl amine | | 6.6 | 8 | 6.6 | 8 | 8 | 8 | 8 | 8 | 8 | 8 | 8 |
| Weight percent of whole composition above about 8000 | | 3.3 | 6.6 | 7.5 | 7.6 | 9.8 | 10.1 | 10.3 | 13.0 | 13.3 | 15.2 | 18.6 |
| | Temperature of test | | | | | | | | | | | |
| Overlap shear (pounds/square inch) | −67 F. | 2207 | 4713 | 4237 | 2853 | 4430 | 4990 | 5110 | 4223 | 4170 | 5316 | 6467 |
| | 75 F. | 4420 | 5286 | 2713 | 2886 | 4877 | 5313 | 5380 | 4110 | 4167 | 5340 | 5167 |
| | 180 F. | 2540 | 4412 | 2152 | 2520 | 3880 | 3986 | 4250 | 3330 | 3046 | 4060 | 3727 |
| | 250 F. | 602 | 1876 | 926 | 566 | 1370 | 1336 | 1550 | 1530 | 990 | 1908 | 1520 |
| T-peel (pounds/inch of width) | −67 F. | 2.5 | 7 | 11.5 | 25 | 14**** | 15 | 18 | 21 | 22.5 | 22 | 30 |
| | 75 F. | .7 | 21 | 7.5 | 26.5 | 25 | 25.5 | 28.5 | 27 | 27.5 | 27 | 27 |
| | 180 F. | 8.5 | 24 | 6.5 | 24.5 | 24.5 | 28.5 | 26.5 | 25 | 24.5 | 24 | 23 |
| Honeycomb peel (inch-pound/inch of width) | −67 F. | | | | 13.8 | | | | 18.3 | | 18.6 | 18 |
| | 75 F. | | | | 9.5 | | | | 21.6 | | 16.2 | 19 |
| 16 | 180 F. | | | | 16.3 | | | | 15.5 | | 15.6 | |

*liquid composition applied to the surface of both adherends with a scrim between the adherends during curing
**a room-temperature-liquid carboxylated acrylonitrile-butadiene elastomer having a number-average molecular weight of about 1000 and having about 0.08 acid-equivalents per 100 grams of material
***a diglycidyl ether of bisphenol A having an epoxide-equivalent-weight of 875–1025 and a Durran's softening point of 95–100°C.
****For reasons not fully understood, better results were obtained for this bonding film in the T-peel test when the surfaces bonded were not primed; when the surfaces were primed, a value of 10 pounds/inch width was obtained.

As shown in the table, the A–D samples, in which the molecules of flexibilizing polymer above 8,000 molecular weight constitute about 7.6 weight-percent or less of the whole composition, do not meet the minimum strength tests established for high-performance sheet-to-sheet and sheet-to-honeycomb members, while the samples F-K in which the amount of high-molecular-weight molecules of flexibilizing polymer is about 10.1 weight-percent or more of the whole composition, do meet those tests. Sample E, in which the molecules above about 8,000 molecular-weight account for 9.8 weight-percent of the composition, is seen to be a marginal composition. However, satisfactory bonding films can be formed in which the number of molecules above about 8,000 molecular-weight is substantially less than the number in sample E, for example, by modifying the epoxy resin blend to use more flexible epoxy resins. Thus, the compositions that are satisfactory should not be defined by reference to a precise weight-percent point for the number of molecules above 8,000 molecular weight. But, in general, the needed molecular weight for the flexibilizing polymer will exist when roughly at least one-tenth of the weight of the composition is accounted for by molecules of flexibilizing polymer that are above about 8,000 in molecular weight.

The obtaining of the desired strength properties also depends on the amount of elastomeric segments in the bonding film. If the amount of elastomeric segments in the composition falls below about 5 parts of elastomeric segments per 100 parts of epoxy-resin segments, the cured bond is too brittle and peel strength properties are too low. On the other hand, if more than 40 parts of elastomeric segments per 100 parts of epoxy-resin segments are included in the composition, the strength properties of the cured bond also decrease below satisfactory levels. Preferred results are obtained when between 10 and 35 parts of elastomeric segments are included for each 100 parts of epoxy-resin segments.

Table III illustrates the changes in strength properties that occur as the amount of elastomeric segments in a bonding film approaches and exceeds 40 parts per 100 parts of epoxy-resin segments. This table reports typical results of tests on eight different samples, A–H, prepared using the same ingredients and proportions as used in Example 1, except that the amount of elastomer (Hycar 1072) was varied from sample to sample and, in addition, (a) the chrome oxide colorant was omitted from all but the A sample, and (b) in samples F–H, a semi-solid novolak epoxy resin having an epoxide-equivalent weight of 175–182 (DEN-438) was used to increase the crosslink density of the cured product; the final blend of epoxy resin in samples F–H was 41.4 parts of Epon 834, 9.6 parts of ERL-2774, 36.7 parts of Epon 1004, and 12.2 parts of the novolak epoxy. The tests reported in the table reveal that as the amount of elastomer increases: (1) overlap shear strengths at room-temperature reach a peak at about 35 to 40 parts of elastomer added and then decline; (2) overlap shear strengths at higher temperatures decline steadily so that at 40 parts of elastomer the values are just acceptable; (3) room-temperature peel strengths steadily increase, but high-temperature peel strengths steadily decline to reach marginal values at about 40 parts of elastomer added; and (4) beam-creep values steadily decline so that marginal values are obtained at 40 parts of elastomer added.

Flexibilizing polymers useful in the present invention may incorporate a variety of different kinds of reactive groups that permit the flexibilizing polymer to be linked to an epoxy resin and integrated into the network of the cured bond. These reactive groups include carboxyl groups, mercapto groups, epoxy groups, and amine groups. Except perhaps for epoxy groups, carboxyl groups are preferred reactive groups on a flexibilizing polymer because, except for the epoxy groups, they are more latent in compositions of the invention.

Acrylonitrile-butadiene elastomeric segments are preferred in compositions of the invention because they are useful through a wide range of temperatures and have good chemical resistance. Another class of useful elastomeric segments include polyether diamines such as poly(tetramethylene oxide) diamine described in U.S. Pat. No. 3,436,359. In general, the useful elastomeric segments in compositions of the invention are provided by chemically resistant, thermally stable materials that may be introduced into the composition in a uniform, finely divided manner and maintain high strength properties and good flexibility over the desired range of temperatures.

An additional example follows to illustrate a bonding film of the invention that incorporates a poly(tetramethylene oxide) diamine elastomer-precursor.

EXAMPLE 3

The ingredients are as follows:

| | | | | Parts by Weight |
|---|---|---|---|---|
| Epoxy resin comprising two diglycidyl ethers of bisphenol A and the previously described ERL 0510 | | | | 100 |
| | Durran's softening point | Epoxide Equivalent Weight | Parts by Weight | |
| Epon 840 | 55–68°C. | 330–380 | 33 | |
| Epon 1001 | 65–74°C. | 425–550 | 53.5 | |
| ERL 0510 | | | 13.5 | |
| | | | | Parts by Weight |
| Poly(tetramethylene oxide) diamine elastomer-precursor (A polyether having a number-average molecular weight of about 10,000 formed from tetrahydrofuran, with amine-termination on both ends of the polymer molecule; method for preparation described in U.S. Pat. 3,436,359; this polyether may be vulcanized with epoxy resins to produce an elastomer) | | | | 20 |
| Dicyandiamide | | | | 2.6 |
| Reaction product of toluene diisocyanate and dimethyl amine | | | | 8 |
| Solvents | | | | |
| Toluene | | | | 66 |
| Acetone | | | | 16 |
| Methanol | | | | 8 |
| Tetrahydrofuran | | | | 19 |
| Methyl ethyl ketone | | | | 44 |
| Dimethylformamide | | | | 8 |

The poly(tetramethylene oxide) diamine and Epon 840 epoxy resin are prereacted by dissolving them together in the toluene, and then stirring the solution for two days at ambient temperature. After the two days, the Epon 1001 and ERL 0510 epoxy resins and the methyl ethyl ketone are added to the solution and the combined mixture is stirred to obtain a uniform solution. The dicyandiamide and reaction product of toluene diisocyanate and dimethyl amine are dissolved in the remaining solvents and added to the combined solution and the mixture stirred to obtain a uniform blend. Bonding films are then prepared by the method taught in Example 1 and the films are tested for their strength properties as follows:

| Temperature of test | 67°F. | 75°F. | 180°F. | 250°F. |
|---|---|---|---|---|
| Overlap shear (pounds/square inch) | 5330 | 4793 | 2540 | 780 |
| T-peel (pounds/inch width) | 19 | 25 | 16 | |
| Honeycomb-peel (inch-pounds/inch width) | 15 | 15 | 17 | |
| Beam-creep (mils) | | 10 | 15 | |

The curing agent in a bonding film of the invention should be latent at room temperature so as to permit storage of the bonding films for convenient periods. (Bonding films of the invention are generally stored at 0°F. to assure that there will be no prereaction.) Some preferred room-temperature-latent curing agents are substituted urea curing agents that decompose and release an amine curing agent such as dimethyl amine when heated to an elevated temperature. The preferred ones decompose at 250°F.; these include 3-(p-chlorophenyl)-1,1-dimethyl urea and the reaction product of toluene diisocyanate and dimethyl amine, which were used in Examples 1–3, as well as 3-phenyl-1,1-dibutyl urea, 3-phenyl-1-benzyl-1-methyl urea, and 3-phenyl-1,1-pentamethylene urea. Other useful room-temperature-latent curing agents are dicyandiamide, the dihydrazides, and amine salts. The best strength properties in bonding films of the invention are obtained when dicyandiamide is included together with a substituted urea. Dicyandiamide gives good strength properties if it is the only curing agent, but requires curing of the bonding film at 350°F.

Though curatives for a reactive elastomer such as carboxylated acrylonitrile-butadiene elastomer are sometimes included to improve the final cure of adhesive compositions containing that elastomer (for example, see Martin et al., U.S. Pat. No. 2,951,004), room-temperature-active curatives such as zinc oxide are preferably not included in the composition of this invention. Such curing agents prematurely cure the elastomer during storage, whereupon the bonding composition does not fillet well and strength properties of the cured product are reduced.

For use in bonding to honeycomb cores, the bonding film of the invention should have a thickness of at least about 5 mils. Thinner films can be used in bonding planar-surfaced articles, or where less adhesive is required. On the other hand, the film generally need not have a thickness greater than about 30 mils. A thin fabric such as a scrim is typically included in the film to improve the handleability of the porduct. Inert fillers may also be included in the film. The film is generally made available in a rather nontacky form and the film then applied with a tacking iron to a surface being bonded. However, the film can be supplied with substantial tackiness. The film is normally supplied on a carrier sheet with a protective film over that surface of the film that is not against the carrier sheet.

What is claimed is:

1. A heat-curable self-supporting bonding film having a thickness between about 5 and 30 mils and consisting essentially of a single reactive layer that includes a heat-curable composition comprising (1) an epoxy resin which has on the average more than one reactive 1,2 epoxy group per molecule; (2) a high-molecular-weight flexibilizing polymer that (a) carries reactive functional groups for chemically linking the flexibilizing polymer to the epoxy resin, (b) provides 5 to 40 parts by weight of elastomeric segments in the composition for each 100 parts by weight of epoxy-resin segments; and (c) comprises sufficient molecules that have a molecular weight of at least 8,000 to account for at least about one-tenth of the weight of the composition; and (3) a room-temperature-latent curing agent active at elevated temperature to initiate reaction of the composition to an integrated cured state; said bonding film being substantially free of room-temperature-active curing agents, and being further characterized in that upon heating to an elevated temperature it (a) becomes flowable so as to wet and form a fillet on the edge portion of a honeycomb pressed against the film, and (b) subsequently cures to provide the high-strength bond necessary both (i) in a sheet-to-sheet structural member and (ii) in a sheet-to-honeycomb structural member; wherein said elastomeric segments provided by the flexibilizing polymer comprise poly(tetramethylene oxide) elastomeric segments.

2. A bonding film of claim 1 in which the flexibilizing polymer comprises a prereaction product of an epoxy resin and a material that provides elastomeric segments in the prereaction product.

3. A bonding film of claim 1 in which the flexibilizing polymer provides between 10 and 35 parts of elastomeric segments in the composition per 100 parts of epoxy-resin segments.

4. A bonding film of claim 1 in which the curing agent comprises a substituted urea that upon heating to about 250°F. releases an amine that catalyzes crosslinking of epoxy resins.

5. A bonding film of claim 4 in which the curing agent further comprises dicyandiamide.

6. A bonding film of claim 1 in which a scrim-type fabric is embedded in the single reactive layer.

* * * * *

UNITED STATES PATENT OFFICE
CERTIFICATE OF CORRECTION

PATENT NO. : 3,894,112
DATED : July 8, 1975
INVENTOR(S) : WARREN C. PAGEL

It is certified that error appears in the above-identified patent and that said Letters Patent are hereby corrected as shown below:

Col. 6, line 68, "combbination" should read -- combination -- .
Col. 7, line 5, "resin" should read -- resins -- .
Col. 9 & 10, TABLE II, below last item listed "16" should be removed completely.
Col. 12, line 60, "porduct" should read -- product -- .
Col. 9 & 10, after line 68, TABLE III has been completely omitted.
Should read --

TABLE III

| | Temperature of test | A | B | C | D | E | F | G | H |
|---|---|---|---|---|---|---|---|---|---|
| Hycar 1372 (parts by weight) | | 25 | 30 | 35 | 40 | 45 | 25 | 35 | 45 |
| Film-weight for first two tests (pounds per square foot) | | 0.06 | 0.061 | 0.063 | 0.062 | 0.057 | 0.057 | 0.055 | 0.060 |
| Overlap shear-strength (pounds/square inch) | -67 F. | 5652 | 6246 | 6680 | 6705 | 6317 | 5930 | 5597 | 6565 |
| | R.T. | 5690 | 5618 | 5486 | 5404 | 5130 | 5824 | 5780 | 5704 |
| | 180 F. | 3398 | 3184 | 2880 | 2702 | 2546 | 3408 | 2876 | 2486 |
| | 250 F. | 1266 | 1122 | 1082 | 1014 | 840 | 1194 | 908 | 716 |
| T-peel strength (pounds per inch width) | -67 F. | 25 | 24 | 30 | 33 | 26 | 20 | 23 | 26 |
| | R.T. | 37 | 40 | 42 | 46 | 44 | 30 | 36 | 40 |
| | 180 F. | 21 | 18 | 18 | 16 | 16 | 26 | 19 | 17 |
| Film-weight for last two tests (pounds/square foot) | | 0.090 | 0.092 | 0.095 | 0.093 | 0.086 | 0.086 | 0.083 | 0.090 |
| Honeycomb peel-strength (inch-pounds/inch width) | -67 F. | 25 | 31.6 | 35.0 | 41.0 | 31.7 | 25.0 | 24.2 | 35.0 |
| | R.T. | 38.2 | 41.0 | 42.4 | 44.2 | 36.6 | 32.5 | 31.6 | 38.2 |
| | 180 F. | 47.5 | 33.2 | 29.5 | 23.8 | 19.5 | 37.6 | 21.6 | 20.6 |
| Foam-creep (mils) | 180 F. | 25.0 | Not run | 29.4 (170 hrs) | 48.5 | 54.0 (72 hrs) | 18.0 | 43 | 54.5 (24 hrs) |

Signed and Sealed this fourth Day of November 1975

[SEAL]

Attest:

RUTH C. MASON
Attesting Officer

C. MARSHALL DANN
Commissioner of Patents and Trademarks